United States Patent
Wang et al.

(10) Patent No.: US 9,409,566 B2
(45) Date of Patent: Aug. 9, 2016

(54) HYBRID VEHICLE AND ASSOCIATED CONTROL METHOD

(71) Applicant: FORD GLOBAL TECHNOLOGIES, LLC, Dearborn, MI (US)

(72) Inventors: Qing Wang, Canton, MI (US); Ming Lang Kuang, Canton, MI (US); Philip Joseph Wiethe, Ann Arbor, MI (US); Jeffrey Randolph Holmes, Plymouth, MI (US); Ryan Abraham McGee, Ann Arbor, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/456,505

(22) Filed: Aug. 11, 2014

(65) Prior Publication Data
US 2014/0350766 A1 Nov. 27, 2014

Related U.S. Application Data

(62) Division of application No. 13/539,945, filed on Jul. 2, 2012, now Pat. No. 8,834,317.

(51) Int. Cl.
*F16H 1/02* (2006.01)
*B60W 20/00* (2016.01)
(Continued)

(52) U.S. Cl.
CPC .............. *B60W 20/30* (2013.01); *B60K 6/445* (2013.01); *B60W 10/06* (2013.01); *B60W 10/08* (2013.01);
(Continued)

(58) Field of Classification Search
CPC ..... B60W 20/30; B60W 10/10; B60W 10/08; B60W 30/182; B60W 10/105; B60W 2540/12; B60W 2540/16; F16H 61/0213; F16H 2059/082; F16H 2059/084; F16H 2059/085; B60K 6/445; B60Y 2300/182; B60Y 2200/92

USPC ............ 477/3, 5, 43, 79, 122, 4, 46, 41, 47; 180/65.21, 65.265, 65.2, 65, 275, 78, 180/285, 65.28, 22, 52
See application file for complete search history.

(56) References Cited

U.S. PATENT DOCUMENTS

| | | | |
|---|---|---|---|
| 7,676,313 B2 | 3/2010 | Ortmann et al. | |
| 7,869,926 B2 | 1/2011 | Tuckfield et al. | |
| 7,921,943 B2 | 4/2011 | Ueoka et al. | |
| 8,272,987 B2 * | 9/2012 | Tiwari | B60K 6/365 180/65.21 |
| 9,140,354 B2 * | 9/2015 | Choi | F16H 59/10 |
| 2006/0231306 A1 | 10/2006 | Severinsky | |
| 2009/0112420 A1 * | 4/2009 | Buur | F16H 59/105 701/56 |

(Continued)

FOREIGN PATENT DOCUMENTS

| CN | 101434191 A | 5/2009 |
|---|---|---|
| CN | 101514746 A | 8/2009 |

(Continued)

OTHER PUBLICATIONS

Chinese Office Action dated Feb. 4, 2015 for corresponding Chinese Application No. 201310268915.6 filed Jun. 28, 2013, pp. 1-5.

*Primary Examiner* — David J Hlavka
(74) *Attorney, Agent, or Firm* — David B. Kelley; Brooks Kushman P.C.

(57) ABSTRACT

A hybrid vehicle and method of control are disclosed wherein the ratio of engine speed to vehicle speed varies continuously in some operating modes and is controlled to simulate a discrete ratio transmission in other operating modes. The disclosure specifies the method of controlling the engine speed and the combined output torque of the engine and at least one traction motor in each of the operating modes. Transitions among operating modes occur in response to driver movement of a shift lever, driver operation of shift selectors, and changes in vehicle speed.

19 Claims, 11 Drawing Sheets

(51) Int. Cl.
　　*B60K 6/445*　　　(2007.10)
　　*B60W 10/06*　　　(2006.01)
　　*B60W 10/08*　　　(2006.01)
　　*B60W 10/105*　　 (2012.01)
　　*B60W 30/182*　　 (2012.01)
　　*F16H 61/02*　　　(2006.01)
　　*B60W 10/10*　　　(2012.01)
　　*F16H 59/08*　　　(2006.01)

(52) U.S. Cl.
　　CPC .............. *B60W 10/10* (2013.01); *B60W 10/105* (2013.01); *B60W 30/182* (2013.01); *F16H 61/0213* (2013.01); *B60W 2540/12* (2013.01); *B60W 2540/16* (2013.01); *B60Y 2200/92* (2013.01); *B60Y 2300/182* (2013.01); *F16H 2059/082* (2013.01); *F16H 2059/084* (2013.01); *F16H 2059/085* (2013.01); *Y02T 10/6239* (2013.01); *Y02T 10/6286* (2013.01); *Y10S 903/93* (2013.01); *Y10T 477/23* (2015.01); *Y10T 477/24* (2015.01)

(56) References Cited

U.S. PATENT DOCUMENTS

| | | | |
|---|---|---|---|
| 2009/0171544 A1* | 7/2009 | Tanaka | F16H 59/0204 701/55 |
| 2009/0210108 A1* | 8/2009 | Okubo | B60K 6/445 701/22 |
| 2011/0202222 A1 | 8/2011 | Yamamoto | |
| 2012/0078477 A1* | 3/2012 | Takashiro | F16H 59/08 701/52 |
| 2014/0004994 A1* | 1/2014 | Wang | B60K 6/445 477/4 |

FOREIGN PATENT DOCUMENTS

| | | |
|---|---|---|
| CN | 101674950 A | 3/2010 |
| CN | 102039809 A | 5/2011 |
| EP | 2075490 A2 | 7/2009 |
| WO | 2008076418 A1 | 6/2008 |

\* cited by examiner

HYBRID VEHICLE AND ASSOCIATED CONTROL METHOD

CROSS REFERENCE TO RELATED APPLICATIONS

This application is a division of U.S. application Ser. No. 13/539,945, now U.S. Pat. No. 8,834,317, filed Jul. 2, 2012, the disclosure of which is incorporated in its entirety by reference herein.

TECHNICAL FIELD

This disclosure relates generally to controlling the engine speed and combined output torque of a hybrid vehicle in response to driver inputs.

BACKGROUND

In a vehicle having a discrete ratio transmission, the speed of the transmission input shaft is constrained to be proportional to the vehicle speed with a finite set of ratios, except during the brief interval while the transmission is shifting from one ratio to another ratio. When the torque converter is locked, the engine speed is also constrained to be proportional to vehicle speed. In a hybrid electric vehicle having a power-split architecture, on the other hand, the transmission does not mechanically impose a strict relationship between the engine speed and the vehicle speed.

Even in vehicles with automatic transmissions, in which selection of the gear ratio or engine speed is ordinarily determined by a controller, some drivers prefer to occasionally over-ride the controller to provide operation similar to a manual transmission. Some vehicles are equipped with shift paddles or other driver interface features which permit the driver to signal a desire for a higher or a lower gear ratio relative to the gear ratio automatically selected by the vehicle controller, with an associated change in engine speed and vehicle torque. In a discrete ratio transmission, the controller responds to such a command by shifting to a different one of the discrete gear ratios, which adjusts engine speed accordingly and provides associated torque multiplication at the vehicle wheels. However, in a vehicle with a continuously variable transmission or similar gearbox, such as a power-split hybrid, the response is more complicated because the transmission does not inherently provide discrete gear ratios with associated different torque multiplication.

SUMMARY

The disclosed hybrid vehicle control strategy implements four different operating modes. The driver determines which operating mode is utilized at any given time via various driver interface elements including a shift lever, a downshift selector, and an upshift selector. In two of the modes, the controller simulates the operation of a discrete ratio transmission, both with regard to the engine speed and with regard to the combined output torque of the engine and the traction motors. The controller utilizes different logic for shutting the engine off and driving solely with electric power depending on which operating mode is active.

In one embodiment, a hybrid electric vehicle includes an internal combustion engine; a continuously variable transmission having an input shaft drivably connected to the internal combustion engine, the transmission including at least one traction motor; a driver operated range selector having first and second forward driving positions; driver operated upshift and downshift selectors; a driver operated accelerator pedal; and a controller. The controller operates the vehicle in multiple operating modes including i) a first mode (Normal), corresponding to the first position (D) of the range selector, ii) a second mode (Sport), corresponding to the second position (S) of the range selector, wherein the controller operates the engine and motor to provide an output torque higher than in the first mode at substantially equal accelerator pedal position and vehicle speed, iii) a third mode (LID), activated from the first mode by operation of the downshift selector, wherein the controller controls engine speed to be proportional to output speed based on a selected virtual gear number, and iv) a fourth mode (SST), activated from the second mode by operation of the upshift or downshift selectors, wherein the engine speed is controlled to be proportional to the transmission output speed, the constant of proportionality determined by the selected virtual gear number. In some embodiments, the controller, when operating in the third or fourth mode, selects a different virtual gear number based on signals from the upshift and downshift selectors or in response to changes in output speed. In some embodiments, selection of a lower virtual gear number in response to a change in output speed causes a transition from the third mode to the first mode. In some embodiments, activation of a cruise control feature or a decrease in accelerator pedal position causes a transition from the third mode to the first mode. In some embodiments, however, transitions from the third mode to the first mode are inhibited when driver workload is high.

In one embodiment, a method of controlling a hybrid electric vehicle having a traction motor and an engine includes, when operating in a first mode (Normal), controlling the engine and traction motor to provide an output torque than varies based on vehicle speed and accelerator pedal position, when operating in a second mode (Sport) activated from first mode by movement of a range selector, controlling the engine and traction motor to provide higher output torque than in the first mode for corresponding vehicle speed and accelerator pedal position, and when operating in a third mode (LID) activated from the first mode by operation of a downshift selector, controlling the engine and traction motor such that the engine speed is proportional to vehicle speed. In some embodiments, operating in the first mode includes automatically starting and stopping the engine such that the engine is not running for a significant portion of the time that the vehicle is in motion. In some embodiments, operating in the second mode includes automatically starting and stopping the engine such that the engine is stopped only when the vehicle is stopped and is restarted as soon as the brake pedal is released and controlling the engine and traction motor such that, when the engine is running, the engine speed is higher than it would be in the first mode for substantially identical vehicle speed and accelerator pedal position. In some embodiments, operating in the third mode includes computing an initial value of a virtual gear number upon entering the third mode, decrementing the virtual gear number in response to operation of the downshift selector, incrementing the virtual gear number in response to operation of an upshift selector, and controlling the engine and traction motor such that the engine speed is proportional to the vehicle speed with a constant of proportionality determined by the virtual gear number, the engine speed lower for higher values of the virtual gear number. Operating in the third mode can also include, in response to activation of a cruise control feature or decrease in accelerator pedal position that exceeds an associated threshold, computing a metric representative of driver workload and, if the metric is below an associated workload threshold, transitioning to the first mode. In some embodiments, a transition from the third mode to the first mode occurs when the vehicle speed decreases below a threshold value. In some embodiments, operating in the second mode includes transitioning to a fourth mode in response to operation of the downshift selector or an upshift selector. Operating in the fourth mode can include computing an initial value of a virtual gear number upon entering the fourth mode, decrementing the virtual gear number in response to operation of the downshift selector, incrementing the virtual gear number in response to operation of an upshift selector, and controlling the engine and traction motor such that the output torque approximates a function of vehicle speed, accelerator pedal position, and virtual gear number, the output torque lower for higher values of virtual gear number at substantially equal vehicle speed and accelerator pedal position and the engine speed is proportional to the vehicle speed with a constant of proportionality determined by the virtual gear number, the engine speed lower for higher values of the virtual gear number. Operating in the fourth mode can include transitioning to the second mode when the upshift selector is held for a period longer than a threshold value.

Embodiments according to the present disclosure can also include a controller for a hybrid powertrain, wherein the controller sends control signals to an engine and at least one traction motor; the controller responds to signals from a range selector with at least two forward driving positions, an upshift selector, a downshift selector, and an accelerator pedal; the controller operates in a first mode (Normal) when the range selector is moved to a first forward driving position; the controller transitions from the first mode to a second mode (Sport) when the range selector is moved to a second forward driving position, the controller operating the engine and the at least one traction motor to deliver a higher output torque in the second mode than in the first mode; and the controller transitions from the first mode to a third mode (LID) when the downshift selector is operated, the controller operating the engine and the at least one traction motor in the third mode such that the engine speed simulates the operation of a discrete ratio transmission. In some embodiments, the controller transitions from the second mode to a fourth mode (SST) when the upshift or downshift selectors are operated, the controller operating the engine and the at least one fraction motor in the fourth mode such that the engine speed and output torque simulates the operation of a discrete ratio transmission.

Various embodiments according to the present disclosure can provide one or more advantages. For example, systems and methods for controlling a hybrid vehicle according to the present disclosure mimic or emulate a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
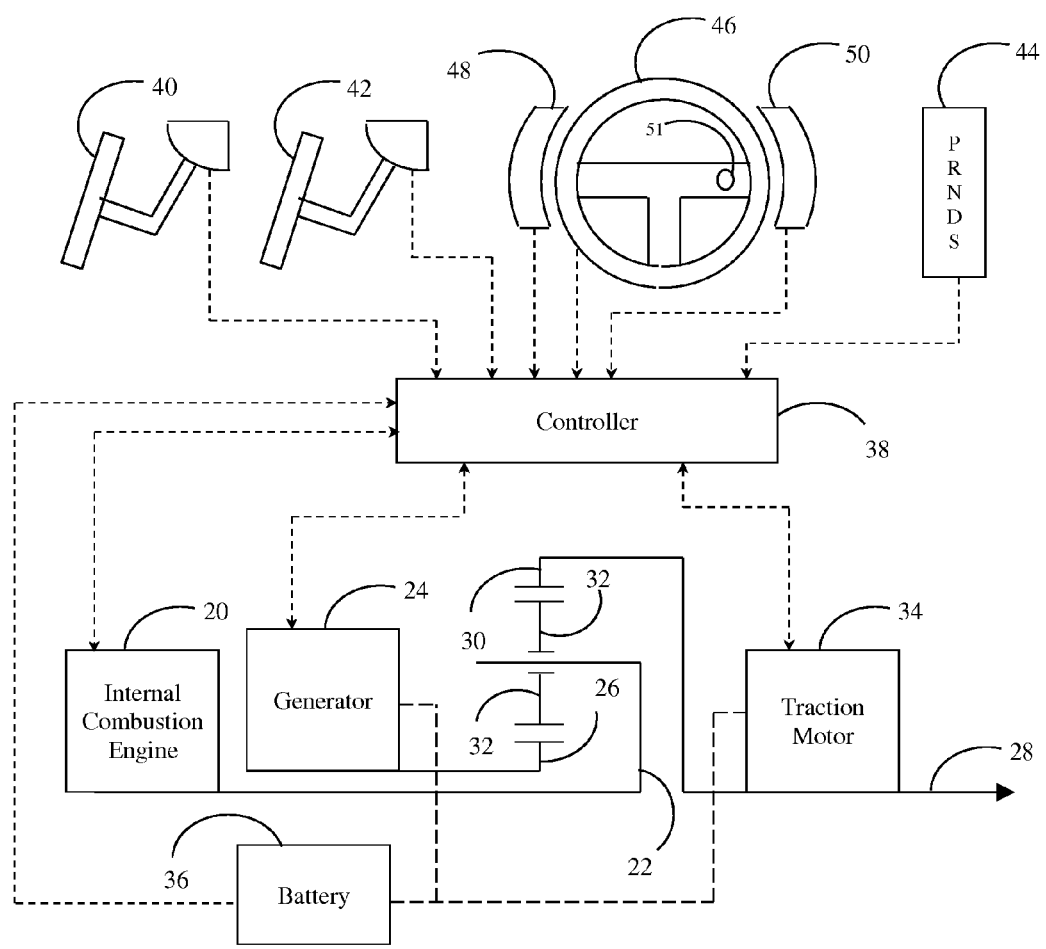
FIG. 1 is a schematic diagram illustrating a vehicle powertrain, controller, and user interface features of a representative embodiment of a hybrid vehicle according to the present disclosure.

A powertrain for a hybrid electric vehicle is illustrated schematically in FIG. 1. The powertrain includes an internal combustion engine 20 driveably connected to a planet carrier 22, a generator 24 driveably connected to a sun gear 26, and an output shaft 28 driveably connected to a ring gear 30. Elements are driveably connected when there is a mechanical power flow path between them such that the speeds of the elements are constrained to be substantially proportional. Planet carrier 22 supports a set of planet gears 32 such that each planet gear is in continuous meshing engagement with sun gear 26 and ring gear 30. Output shaft 28 drives the vehicle wheels directly or indirectly, such as via a differential assembly, for example.

Traction motor 34 is driveably connected to the output shaft 28. Both the generator 24 and the traction motor 34 are reversible electrical machines that are capable of converting electrical power into rotational mechanical power or converting rotational mechanical power into electrical power. The terms generator and motor should be regarded merely as labels for ease of description and does not limit the function or operation of either electrical machine. Generator 24 and fraction motor 34 are both electrically connected to battery 36.

The rotational speed of sun gear 26, carrier 22, and ring gear 30 are linearly related such that speed of carrier 22 is a weighted average of the speed of sun gear 26 and ring gear 30. Consequently, the speed of the engine 20 is not constrained to be proportional to the speed of the output shaft 28 in this arrangement. Instead, the engine speed can be selected or controlled independently of the vehicle speed by setting the generator speed accordingly. Power flows from the engine to the output shaft through a combination of mechanical power transfer and electrical power transfer. During some operating conditions, the engine 20 can generate more power than what is delivered to the output shaft 28 with the difference, neglecting efficiency losses, delivered to battery 36. Under other operating conditions, the battery 36 in combination with generator 24 and/or traction motor 34 can supplement the power delivered by the engine 20 such that more power is delivered to the output shaft 28.

The engine 20, generator 24, and traction motor 34, all respond to control signals from controller 38. These control signals determine the amount of torque generated. The controller also receives speed signals from the engine 20, generator 24, and traction motor 34 and a state of charge signal from battery 36. The controller accepts input signals indicating driver intention from a brake pedal 40, an accelerator pedal 42, a shift lever 44, a steering wheel 46, a downshift selector 48, an upshift selector 50, and a cruise control button 51. Shift lever 44 allows the driver to select Park, Reverse, Neutral, Drive, and Sport driving modes.

Figure 2:
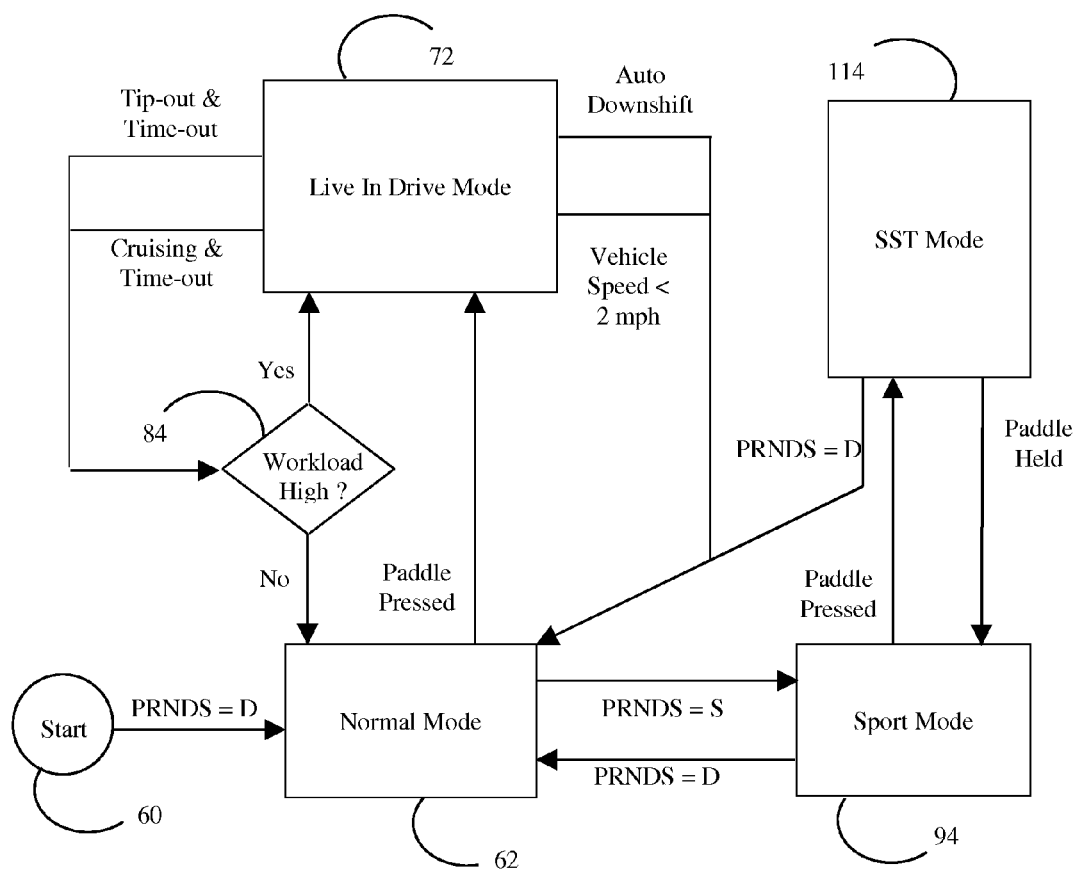
FIG. 2 is a state transition chart illustrating operation of a system or method of an embodiment of the present disclosure.
Figure 3:
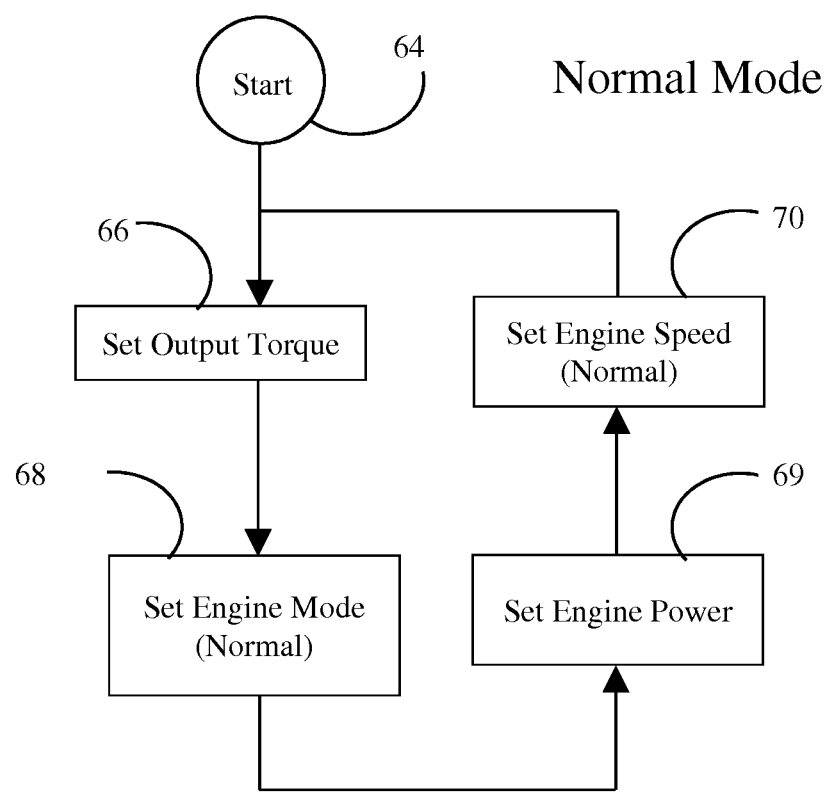
FIG. 3 is a flow chart illustrating operation of a system or method according to various embodiments when in a Normal operating mode.
Figure 4:
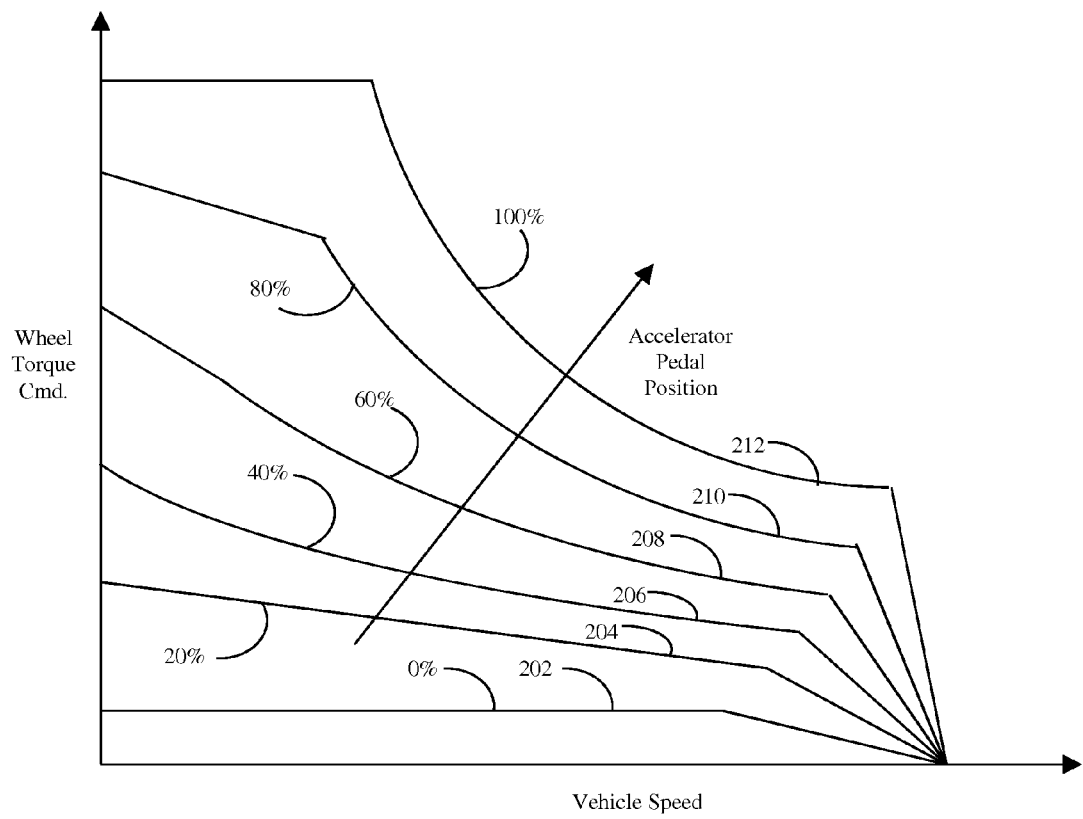
FIG. 4 is a graph illustrating a relationship between vehicle speed, accelerator pedal position, and wheel torque command of a representative embodiment according to the disclosure.

The top level control states are illustrated in FIG. 2. The controller starts in state 60 and transitions to Normal mode 62 as soon as the driver selects the Drive (D) position using shift lever 44. Operation in Normal mode is illustrated by the flow diagram of FIG. 3. In Normal mode, the controller repeatedly performs the operations of setting the output torque 66, setting the engine mode 68, and setting the engine speed 70. In Normal mode, the target output torque is calculated at step 66 based on accelerator pedal position and vehicle speed using a table such as that illustrated in FIG. 4. Vehicle speed can be calculated from traction motor speed or wheel speed sensors. Engine mode is set to either running or stopped at step 68 using a variety of input signals including battery state of charge, output power command, accelerator pedal position, and vehicle speed. If the engine mode is running, a target engine speed is calculated to minimize fuel consumption while delivering the desired output torque and maintaining the battery at a desired state of charge. In this Continuously Variable Transmission (CVT) mode, the engine speed varies continuously, as opposed to varying in discrete steps, in response to changes in accelerator pedal position and vehicle speed. Finally, operating parameters of the engine, generator, and traction motor are adjusted such that the actual output torque and engine speed tend toward the selected targets.

Referring again to FIG. 2, the controller transitions from Normal mode 62 to Live-In-Drive (LID) mode 72 whenever the driver activates the downshift selector 48. LID mode simulates the experience of driving a vehicle with a discrete ratio transmission. Operation in LID mode is illustrated by the flow diagram of FIG. 5. Upon entering LID mode, the controller selects an initial virtual gear ratio at step 74 and then repeatedly performs the operations of setting the output torque at steps 76 and 66', setting the engine speed at step 78, and updating the virtual gear ratio in steps 80 and 82. Each of these operations is discussed in additional detail below. As shown in FIG. 2, a number of conditions cause the controller to transition back to Normal mode 62 including vehicle speed dropping below a low threshold value or an automatically selected downshift. Additionally, a transition can be triggered when the controller detects a cruising condition, as indicated by activation of the cruise control 51, or a tip-out condition, indicated by a reduction in accelerator pedal position, and the condition persists for some predetermined amount of time. This latter type of condition will not result in a transition, however, if the controller detects a high driver workload at step 84, such as might be indicated by large displacements of steering wheel 46, large yaw, pitch, or roll rates, or high longitudinal or lateral accelerations, for example.

Figure 5:
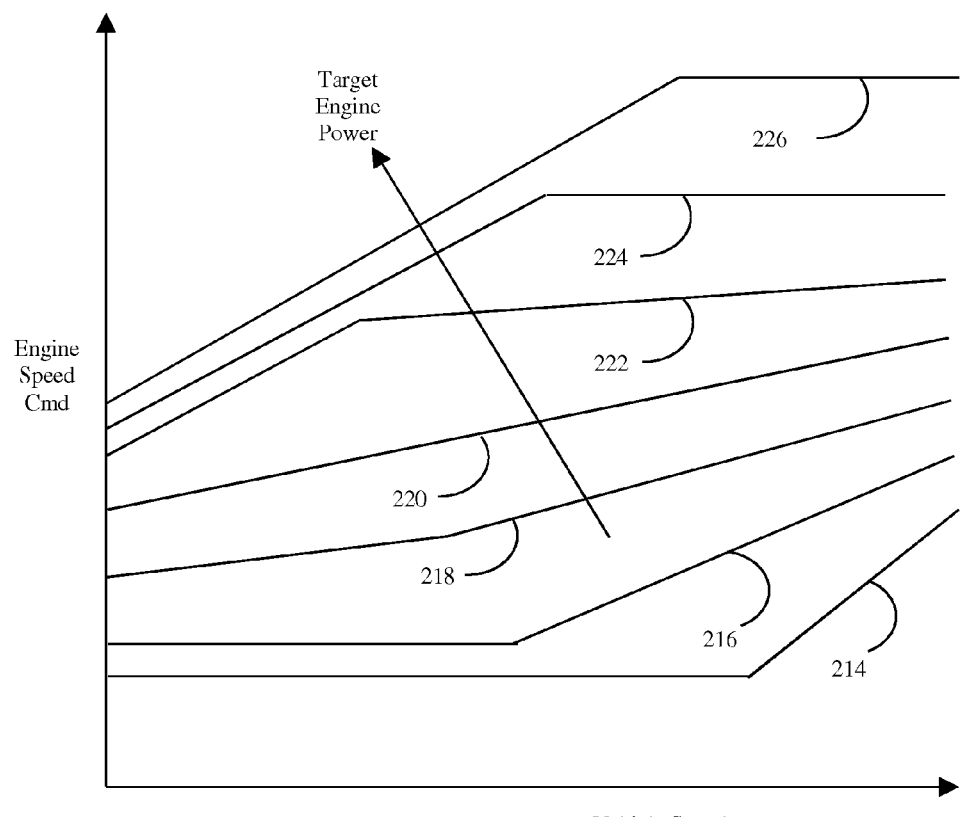
FIG. 5 is a flow chart illustrating operation of a system or method according to various embodiments when in the Live-In-Drive (LID) operating mode.
Figure 6:
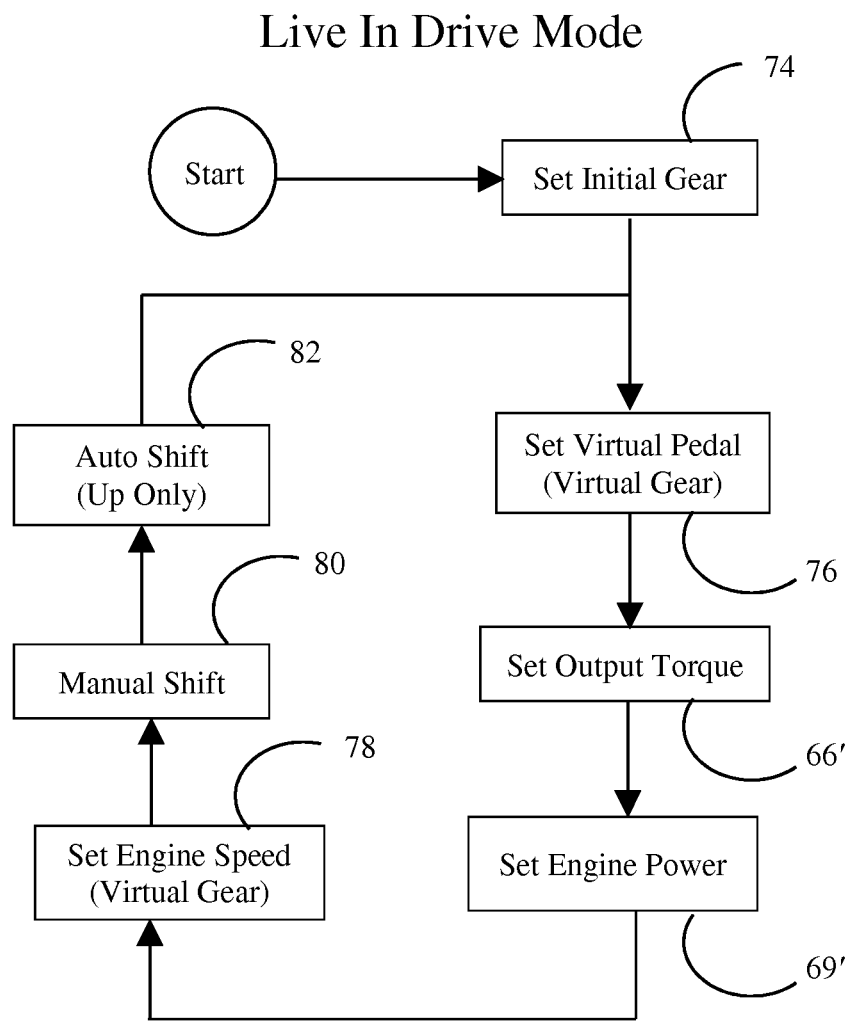
FIG. 6 is a graph illustrating a relationship between vehicle speed, virtual gear number, and engine speed of a representative embodiment according to the disclosure.

As also shown in FIG. 5, in LID mode 72, the engine speed is calculated in step 78 based on the vehicle speed and the virtual gear number as illustrated in FIG. 6. For a particular virtual gear number ($1^{st}$ through $8^{th}$ in the representative embodiment illustrated), the engine speed (We) is directly proportional to vehicle speed (V), as it would be with a step ratio transmission. However, if that fixed ratio would result in an engine speed (We) less than a minimum engine speed ($We_{min}$), the engine speed (We) is set to the minimum engine speed ($We_{min}$). Similarly, the engine speed (We) is not set higher than a maximum engine speed ($We_{max}$). Both minimum and maximum engine speeds can be a function of vehicle speed (V).

Figure 7:
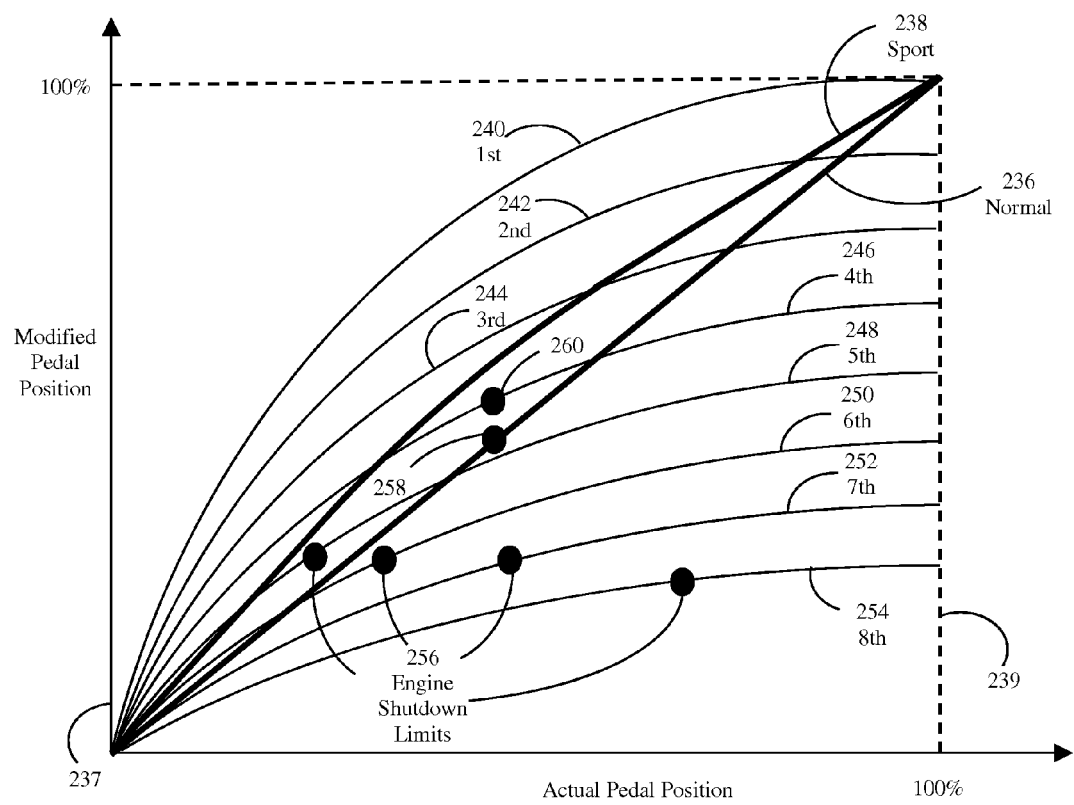
FIG. 7 is a graph illustrating a relationship between actual accelerator pedal position, virtual gear number or operating mode, and modified pedal position of a representative embodiment according to the disclosure.

In step 76, a modified accelerator pedal position is calculated from the measured accelerator pedal position using a table such as illustrated in FIG. 7. This modified accelerator pedal position is used in place of the actual pedal position in step 66' to calculate the target output torque. The curves in FIG. 7 are selected to simulate the output torque capability of a powertrain with a discrete ratio transmission. Specifically, as the virtual gear number ($1^{st}$ through $8^{th}$ in this example) increases, the resulting target output torque is lower for any given non-zero accelerator pedal position. The combined effect of steps 76 and 66' is operation of the engine and at least one traction motor such that combined output torque corresponds to one of a plurality of output torque functions, each output torque function having a distinct output torque at a maximum value of accelerator pedal position for an associated vehicle speed.

As also shown in FIG. 5, in step 80, the controller checks for activations of either the upshift selector or the downshift selector and adjusts the virtual gear number accordingly. In step 82, the controller determines if there is a need to automatically adjust the virtual gear number. In particular, an upshift can be triggered by an increase in vehicle speed. Similarly, a downshift can be indicated when vehicle speed decreases. However, as mentioned previously, the controller transitions back to Normal mode 62 when an automatic downshift is indicated. The automatic shift criteria are calibrated such that automatic changes in virtual gear number are less common than shifts in a traditional discrete ratio automatic transmission.

Figure 8:
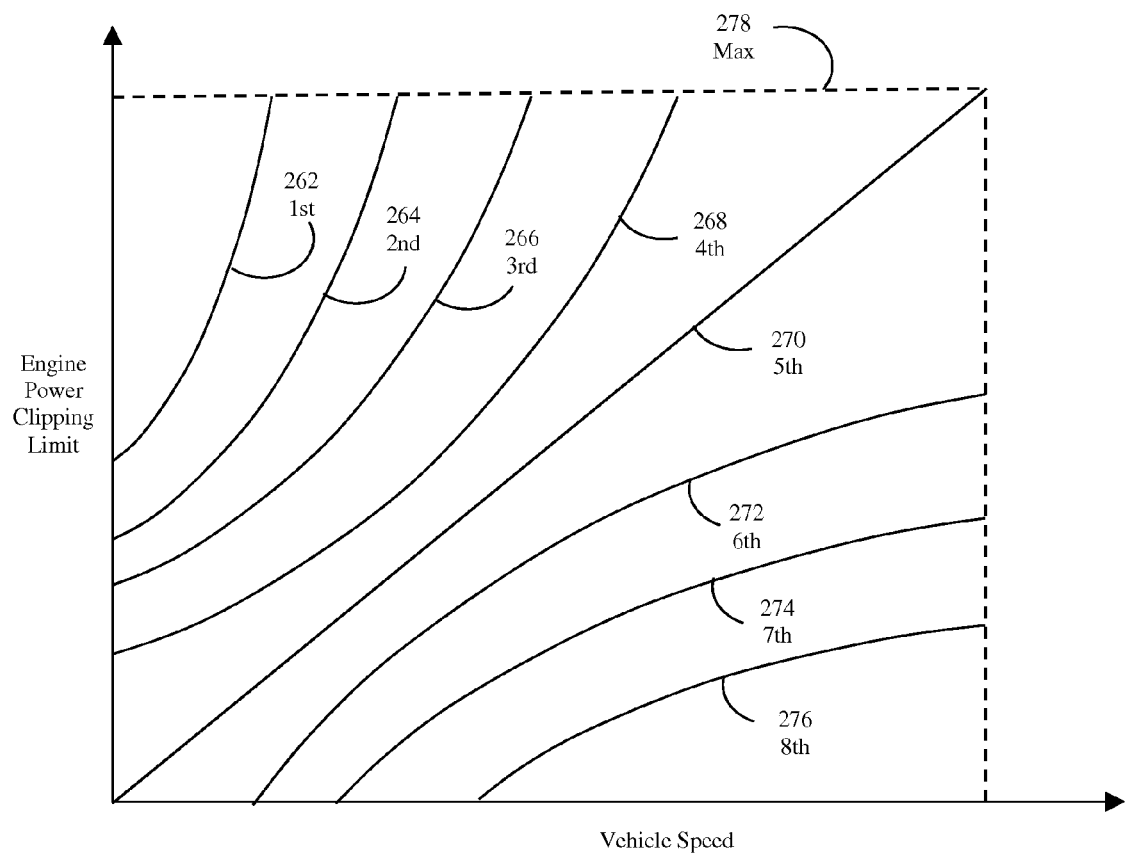
FIG. 8 is flow chart illustrating the selection of an initial virtual gear number when transitioning into LID or Select Shift Transmission (SST) operating modes of one embodiment of the disclosure.

The algorithms for calculating target engine speed and target output torque both utilize the virtual gear number. Therefore, an initial virtual gear number is determined upon transitioning into LID mode. At step 74, the controller selects an initial virtual gear number that will result in an increase in engine speed. The procedure for setting the initial virtual gear number is further illustrated in the flow chart of FIG. 8. In step 84, the controller calculates $We_{max}$, the maximum engine speed at the current vehicle speed, using a formula or a lookup table, for example. Next, in step 86, the controller computes $Gear_{min}$, the lowest virtual gear number for which the target engine speed would be less than $We_{max}$ at the current vehicle speed. This step can be done with either an iterative algorithm or using a lookup table. Next, the controller computes the target engine speed corresponding to $Gear_{min}$ at the current vehicle speed, $W(V, Gear_{min})$. In step 88, this is compared to the current engine speed, We$_{current}$. If We$_{current}$ is greater than W(V, Gear$_{min}$), then the target engine speed will be restricted by maximum engine speed. Consequently, in step 90, the target gear is set to Gear$_{min}$-1 and the target engine speed is set to We$_{max}$. However, in the more typical case where We$_{current}$ is less than W(V, Gear$_{min}$), step 92 selects the highest virtual gear number that will result in an increase in engine speed relative to the current engine speed.

Referring once again to FIG. 2, the controller transitions from Normal mode 62 to Sport mode 94 whenever the driver moves the shift lever 44 to the Sport (S) position. Operation in Sport mode is illustrated by the flow diagram of FIG. 9. The controller repeatedly performs the operations of setting the output torque 96 and 66", setting the engine speed 99, and setting the engine mode 98. To provide a more sporty reaction to accelerator pedal movements, the target output torque is computed based on a modified accelerator pedal position as illustrated by the upper heavy line 238 in FIG. 7. The mapping between actual accelerator pedal position and modified accelerator pedal position is selected such that the value is equal at the minimum 237 and maximum 239 values, but the modified value is higher for all intermediate levels.

Figure 9:
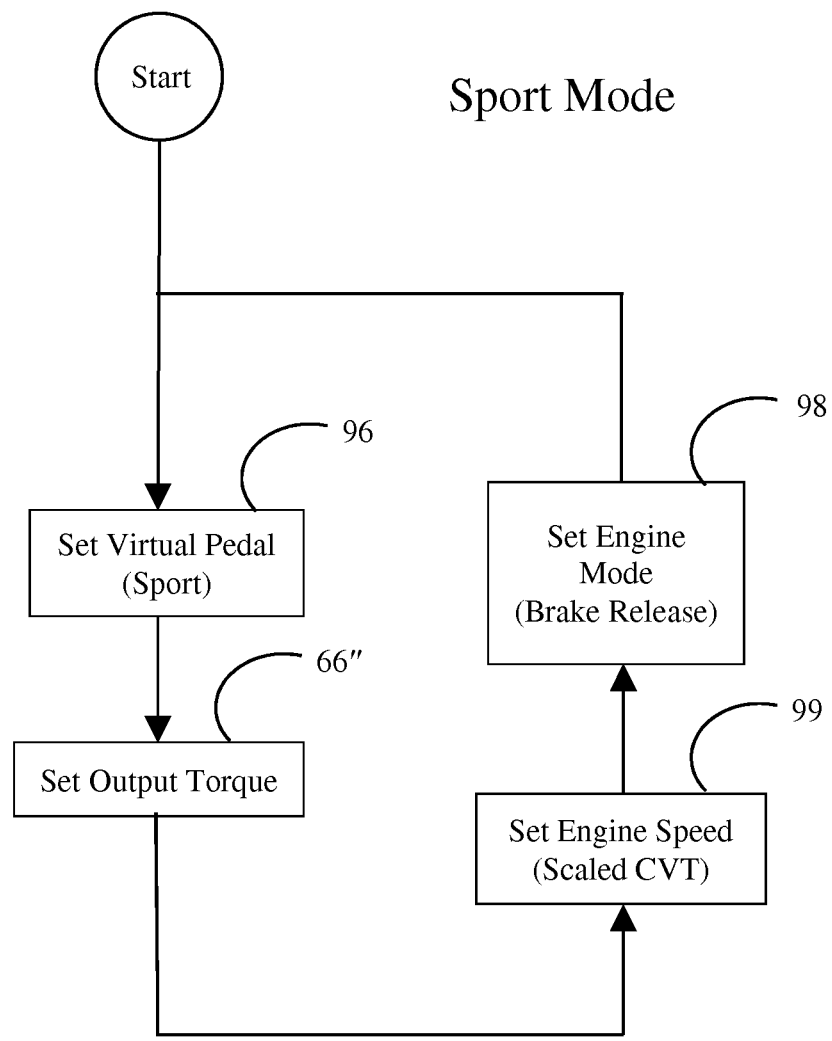
FIG. 9 is flow chart illustrating operation of a system or method according to embodiments of the disclosure when in the Sport operating mode.
Figure 10:
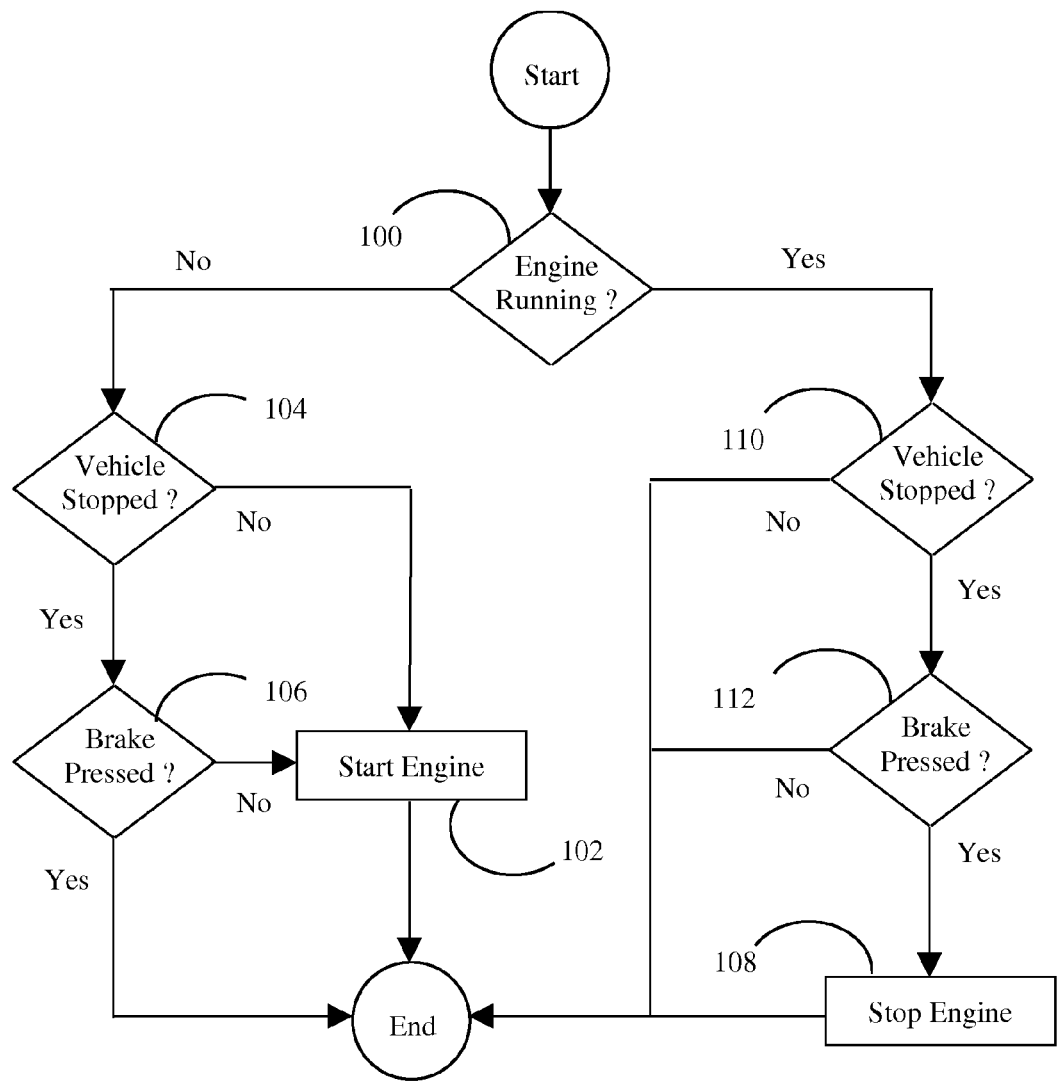
FIG. 10 is a flow chart illustrating operation of a strategy for shutting off and restarting the engine in certain operating modes of various embodiments of the disclosure.

As also shown in FIG. 9, target engine speed is set in step 99 using a similar algorithm to that used in Normal mode. However, the target engine speed is scaled up by a designated amount, such as 10-20% for example, relative to the value that would be used in Normal mode. Unlike the algorithm for setting engine mode used in Normal mode, the algorithm used in Sport mode as indicated at step 98 only stops the engine when the vehicle is stationary and the brake pedal is depressed. The modified engine mode setting algorithm is illustrated in FIG. 10. If the engine is currently stopped 100, then the engine is restarted at step 102 if the vehicle is moving 104 or the brake pedal is released 106. Similarly, if the engine is currently running, then the engine is stopped at step 108 only if the vehicle is stationary 110 and the brake pedal is pressed 112.

Figure 11:
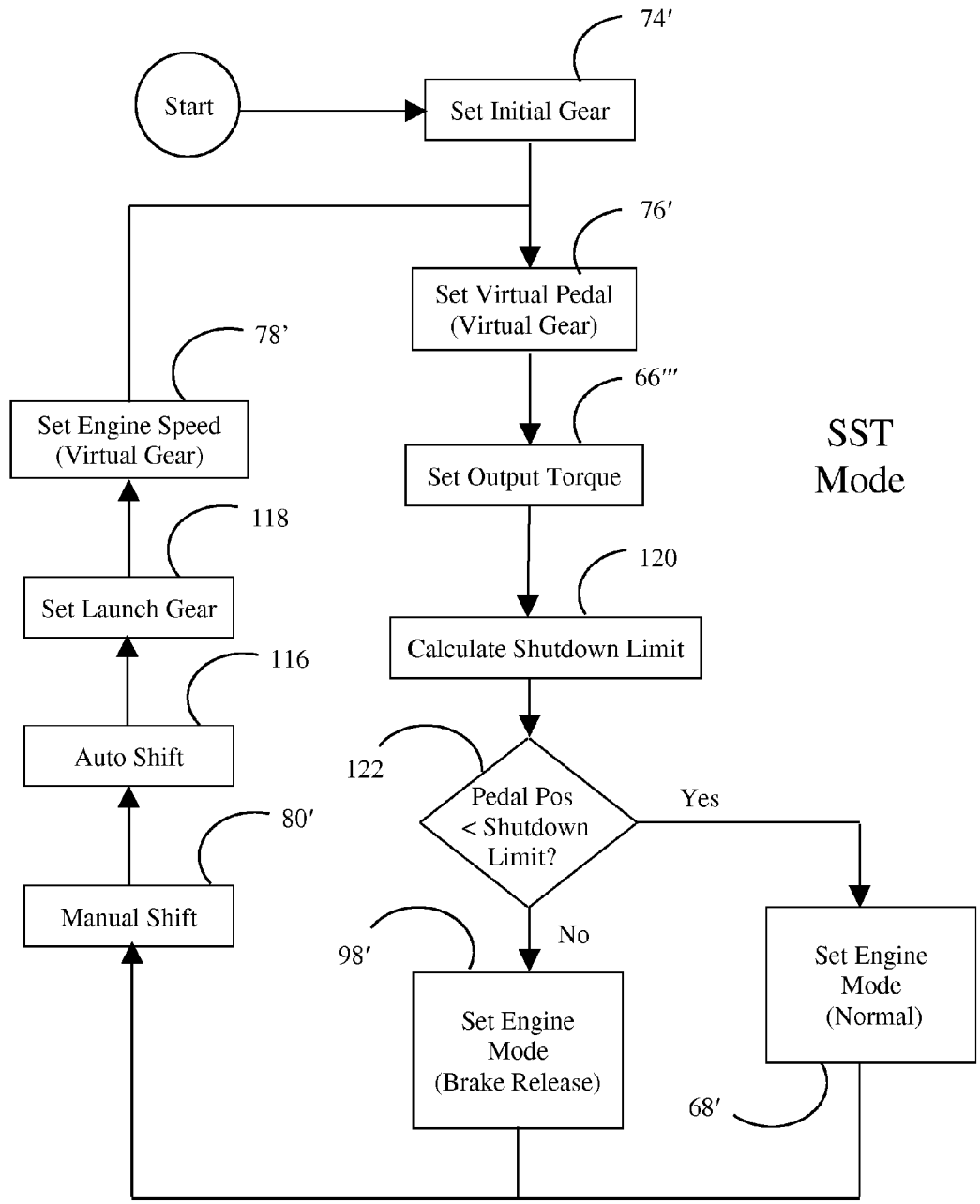
FIG. 11 is a flow chart illustrating operation of a system or method when in the SST operating mode according to various embodiments of the disclosure.

If the driver activates either the upshift of downshift selector while in Sport mode 94, the controller transitions to Select Shift Transmission (SST) mode 114, as shown in FIG. 2. In SST mode, the target engine torque and target engine speed are set to simulate a discrete ratio transmission, as described with respect to LID mode. However, the controller will remain in SST mode until the driver indicates a desire to leave this mode by either holding a shift selector 48 or 50 for several seconds of by moving shift lever 44 back to the Drive (D) position. Operation in SST mode is illustrated by the flow diagram of FIG. 11. In SST mode, the virtual gear number is adjusted at step 80' in response to activation of downshift selector 48 and upshift selector 50 in the same manner as in LID mode. In addition, the controller can automatically adjust the virtual gear number, either up or down, in response to changes in vehicle speed or accelerator pedal position. This automatic feature sets the virtual gear number to 1st gear as the vehicle comes to a stop. However, the driver can override this selection by manipulating the shift selectors while the vehicle is stationary in step 118. In SST mode, the engine mode depends on the virtual gear number, vehicle speed, and accelerator pedal position. In step 120, the controller calculates an engine shutdown limit, which is an accelerator pedal position below which electric drive is enabled. The shutdown limit is a function of output power demand, virtual gear number, and vehicle speed. The shutdown limits for several gear ratios at a particular vehicle speed and output power demand are illustrated by black circles in FIG. 7. When one of the higher virtual gear numbers, i.e. 5th-8th, is active and the accelerator pedal position is less than the shutdown limit, the normal engine mode algorithm 68' of Normal mode is used. If a lower virtual gear number, i.e. 1st-4th, is active, or if the accelerator position is above the engine shutdown limit, then the more restrictive algorithm 98' of Sport and LID modes is used.

As illustrated by the representative embodiments described above, various embodiments according to the present disclosure can provide one or more advantages, such as emulating a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. The embodiments described herein that are described as less desirable than other embodiments or prior art implementations with respect to one or more characteristics are not outside the scope of the disclosure and may be desirable for particular applications.

What is claimed is:

1. A method of controlling a vehicle comprising:
    operating an engine and a traction motor in a first (Normal) mode in which an output torque varies based on a vehicle speed and an accelerator pedal position;
    in response to movement of a range selector, increasing the output torque to transition to a second (Sport) mode; and
    in response to operation of a downshift selector, transitioning to a third (LID) mode in which an engine speed is maintained proportional to vehicle speed.

2. The method of claim 1 wherein operating in the first mode comprises:
    automatically starting and stopping the engine such that the engine is not running for a significant fraction of a time that the vehicle is in motion.

3. The method of claim 1 wherein the vehicle includes a brake pedal and wherein operating in the second mode comprises:
    automatically starting and stopping the engine such that the engine is stopped only when the vehicle is stopped and is restarted as soon as the brake pedal is released; and
    controlling the engine and traction motor such that, when the engine is running, the engine speed is higher than it would be in the first mode at equal vehicle speed and accelerator pedal position.

4. The method of claim 3, wherein operating in the second mode further comprises transitioning to a fourth (SST) mode in response to operation of the downshift selector or an upshift selector, operating in the fourth mode comprising:
    computing an initial value of a virtual gear number upon entering the fourth mode;
    decrementing the virtual gear number in response to operation of the downshift selector;

incrementing the virtual gear number in response to operation of the upshift selector; and controlling the engine and traction motor such that:

the output torque approximates a function of vehicle speed, accelerator pedal position, and virtual gear number, the output torque lower for higher values of virtual gear number at equal vehicle speed and accelerator pedal position; and the engine speed is proportional to the vehicle speed with a constant of proportionality determined by the virtual gear number wherein the engine speed is lower for higher values of the virtual gear number.

5. The method of claim 4 wherein operating in the fourth mode further comprises transitioning to the second mode when the upshift selector is held for a period longer than a threshold value.

6. The method of claim 1 wherein operating in the third mode comprises:

computing an initial value of a virtual gear number upon entering the third mode;

decrementing the virtual gear number in response to operation of the downshift selector;

incrementing the virtual gear number in response to operation of an upshift selector; and controlling the engine and traction motor such that the engine speed is proportional to the vehicle speed with a constant of proportionality determined by the virtual gear number wherein the engine speed is lower for higher values of the virtual gear number.

7. The method of claim 6 wherein operating in the third mode further comprises transitioning to the first mode when the vehicle speed decreases below a threshold value.

8. The method of claim 7 wherein operating in the third mode further comprises in response to activation of a cruise control feature or decrease in accelerator pedal position that exceeds an associated threshold, computing a metric representative of driver workload; and if the metric is below an associated workload threshold, transitioning to the first mode.

9. A method of controlling a vehicle comprising:

operating an engine and a traction motor in a Normal mode;

in response to movement of a range selector, transitioning to a Sport mode wherein an output torque is maintained higher than in Normal mode at equal vehicle speed and accelerator pedal position; and in response to operation of a downshift selector, transitioning to an LID mode wherein an engine speed is maintained proportional to vehicle speed.

10. The method of claim 9 wherein operating in the Normal mode comprises:

automatically starting and stopping the engine such that the engine is not running for a significant fraction of a time that the vehicle is in motion.

11. The method of claim 9 wherein the vehicle includes a brake pedal and wherein operating in the Sport mode comprises:

automatically starting and stopping the engine such that the engine is stopped only when the vehicle is stopped and is restarted as soon as the brake pedal is released; and controlling the engine and traction motor such that, when the engine is running, the engine speed is higher than it would be in the Normal mode at equal vehicle speed and accelerator pedal position.

12. The method of claim 11, wherein operating in the Sport mode further comprises transitioning to an SST mode in response to operation of the downshift selector or an upshift selector, operating in the SST mode comprising:

computing an initial value of a virtual gear number upon entering the SST mode;

decrementing the virtual gear number in response to operation of the downshift selector;

incrementing the virtual gear number in response to operation of the upshift selector; and controlling the engine and traction motor such that:

the output torque approximates a function of vehicle speed, accelerator pedal position, and virtual gear number, the output torque lower for higher values of virtual gear number at equal vehicle speed and accelerator pedal position; and the engine speed is proportional to the vehicle speed with a constant of proportionality determined by the virtual gear number wherein the engine speed is lower for higher values of the virtual gear number.

13. The method of claim 12 wherein operating in the SST mode further comprises transitioning to the Sport mode when the upshift selector is held for a period longer than a threshold value.

14. The method of claim 9 wherein operating in the LID mode comprises:

computing an initial value of a virtual gear number upon entering the LID mode;

decrementing the virtual gear number in response to operation of the downshift selector;

incrementing the virtual gear number in response to operation of an upshift selector; and controlling the engine and traction motor such that the engine speed is proportional to the vehicle speed with a constant of proportionality determined by the virtual gear number wherein the engine speed is lower for higher values of the virtual gear number.

15. The method of claim 14 wherein operating in the LID mode further comprises transitioning to the Normal mode when the vehicle speed decreases below a threshold value.

16. The method of claim 15 wherein operating in the LID mode further comprises in response to activation of a cruise control feature or decrease in accelerator pedal position that exceeds an associated threshold, computing a metric representative of driver workload; and if the metric is below an associated workload threshold, transitioning to the Normal mode.

17. A controller comprising:

communications channels configured to receive signals from a range selector, an upshift selector, and a downshift selector and configured to send signals to an engine and a traction motor to produce an engine speed and an output torque; and control logic programmed to operate in a first mode (Normal) when the range selector is moved to a first forward driving position;

to respond to movement of the range selector to a second forward driving position by increasing output torque to transitioning to a second mode (Sport) wherein the output torque is maintained higher than in the first mode; and to respond to operation of the downshift selector by transitioning to a third mode (LID) wherein engine speed is controlled to vary in proportion to a vehicle speed.

18. The controller of claim 17 wherein the controller logic is programmed to transition from the second mode to a fourth mode (SST) in response to operation of the upshift or downshift selectors and to control the engine and traction motor in the fourth mode such that the engine speed varies in proportion to the vehicle speed.

19. The controller of claim 18 wherein the controller operates the engine and the traction motor in the fourth mode such that the output torque simulates the operation of a discrete ratio transmission.

* * * * *